(12) United States Patent
Baitokara et al.

(10) Patent No.: US 12,458,947 B2
(45) Date of Patent: Nov. 4, 2025

(54) PACKING SECTION FOR A GAS/LIQUID SEPARATION COLUMN

(71) Applicant: L'Air Liquide, Societe Anonyme pour l'Etude et l'Exploitation des Procedes Georges Claude, Paris (FR)

(72) Inventors: Victor Baitokara, Vitry sur Seine (FR); Vincent Faucher, Champigny-sur-Marne (FR); Ludovic Amant, Champigny-sur-Marne (FR); Philippe Danel, Vitry sur Seine (FR); Gilles Lebain, Vitry sur Seine (FR); Cyrille Babinet, Vitry sur Seine (FR)

(73) Assignee: L'Air Liquide, Societe Anonyme Pour l'Etude et l'Exploitation des Procedes Georges Claude, Paris (FR)

(*) Notice: Subject to any disclaimer, the term of this patent is extended or adjusted under 35 U.S.C. 154(b) by 322 days.

(21) Appl. No.: 18/118,413

(22) Filed: Mar. 7, 2023

(65) Prior Publication Data
US 2023/0278003 A1  Sep. 7, 2023

(30) Foreign Application Priority Data

Mar. 7, 2022 (FR) ........................... 2201949
Oct. 24, 2022 (FR) ........................... 2211002

(51) Int. Cl.
*B01J 19/32* (2006.01)
*B01D 3/00* (2006.01)
*B01D 53/18* (2006.01)

(52) U.S. Cl.
CPC ............... *B01J 19/32* (2013.01); *B01D 3/008* (2013.01); *B01D 53/185* (2013.01); *B01J 2219/32275* (2013.01)

(58) Field of Classification Search
CPC ...... B01D 3/008; B01D 3/328; B01D 53/185; B01J 19/32; B01J 2219/32275
(Continued)

(56) References Cited

U.S. PATENT DOCUMENTS 5,224,351 A * 7/1993 Jeannot ................. B01D 3/008
                                                       196/139
5,456,865 A    10/1995 Pluess et al.
(Continued)

FOREIGN PATENT DOCUMENTS

CN     108 479 685          9/2018
DE       2049558 A1 *       4/1972
(Continued)

OTHER PUBLICATIONS

English Abstract of DE 2049558 A1 (Year: 1972).*
(Continued)

*Primary Examiner* — Charles S Bushey
(74) *Attorney, Agent, or Firm* — Justin K. Murray

(57) ABSTRACT

A packing section intended to be installed in a casing so as to form a gas/liquid separation column may include a block for treating a fluid that has a generally cylindrical shape extending along a longitudinal direction, the treatment block being formed by a stack of plates for treating the fluid along the longitudinal direction, the treatment block having a first disc-shaped face and a second disc-shaped face that each extend in planes parallel to one another, the treatment block having an external face extending over the perimeter of said treatment block between the first disc-shaped face and the second disc-shaped face, the packing section having at least one element for holding the treatment block that extends at least partially around the external face of the treatment block, the holding element having a portion for holding the treatment plates of the treatment block in position.

11 Claims, 3 Drawing Sheets

(58) Field of Classification Search
USPC .................................................. 261/97, 110
See application file for complete search history.

(56) References Cited

U.S. PATENT DOCUMENTS

| | | | | |
|---|---|---|---|---|
| 5,585,046 | A | * 12/1996 | Jansen | ................... B01J 19/325 |
| | | | | 261/DIG. 77 |
| 6,170,805 | B1 | * 1/2001 | Hug | ........................ B01J 19/32 |
| | | | | 261/112.2 |
| 6,726,188 | B2 | * 4/2004 | Dichtl | ................... B01J 19/325 |
| | | | | 261/97 |
| 8,807,541 | B2 | 8/2014 | Kehrer et al. | |

FOREIGN PATENT DOCUMENTS

| | | |
|---|---|---|
| EP | 0 601 257 | 6/1994 |
| EP | 0913192 A1 * | 5/1999 |
| EP | 1 593 427 | 11/2005 |
| EP | 3 718 617 | 10/2020 |
| FR | 2 676 371 | 11/1992 |
| JP | H11 99329 | 4/1999 |
| WO | WO 2017/020990 A1 * | 2/2017 |

OTHER PUBLICATIONS

English Machine Translation of EP 0913192 A1 (Year: 1999).*
English Machine Translation of WO 2017/020990 A1 (Year: 2017).*
French Search Report for FR 2 201 949, mailed Sep. 19, 2022.

* cited by examiner

[Fig. 1]
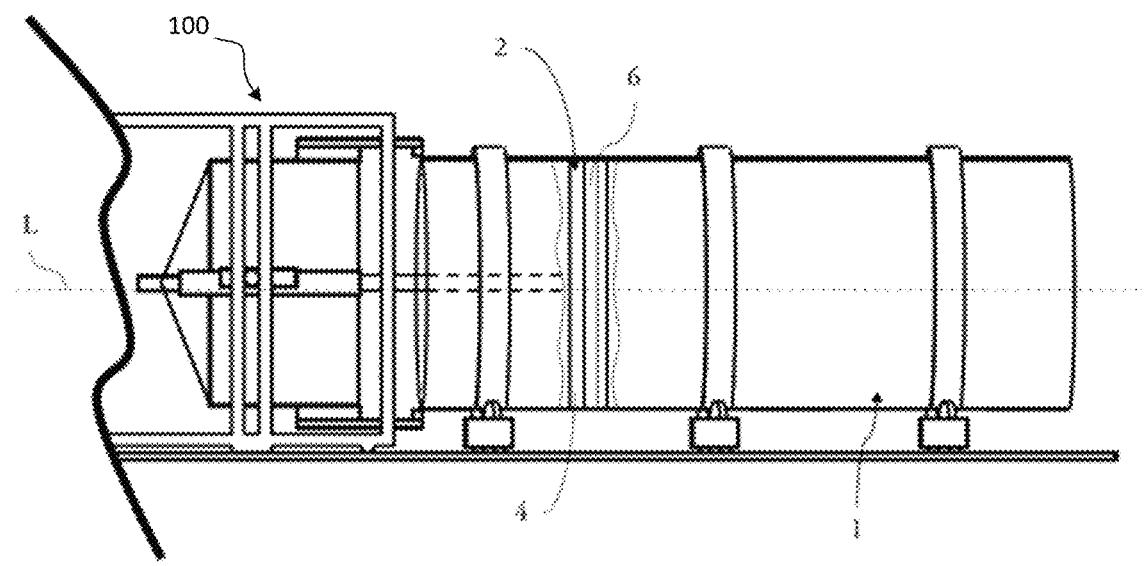
[Fig. 2]
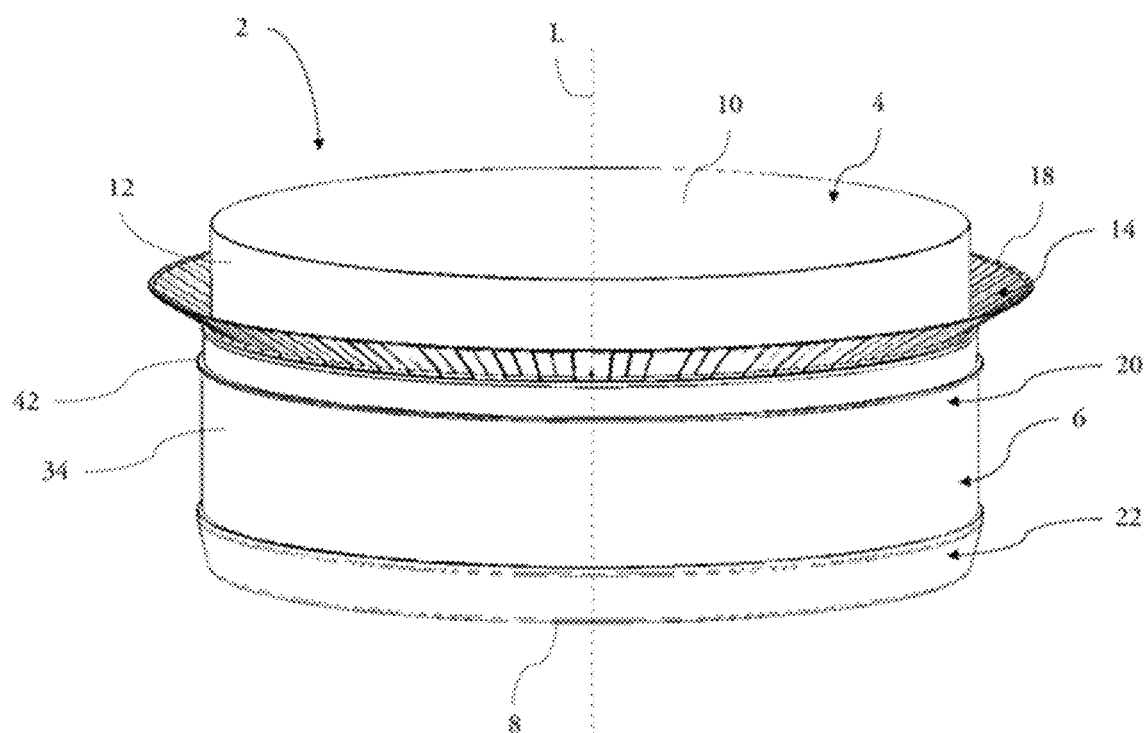

[Fig. 3]
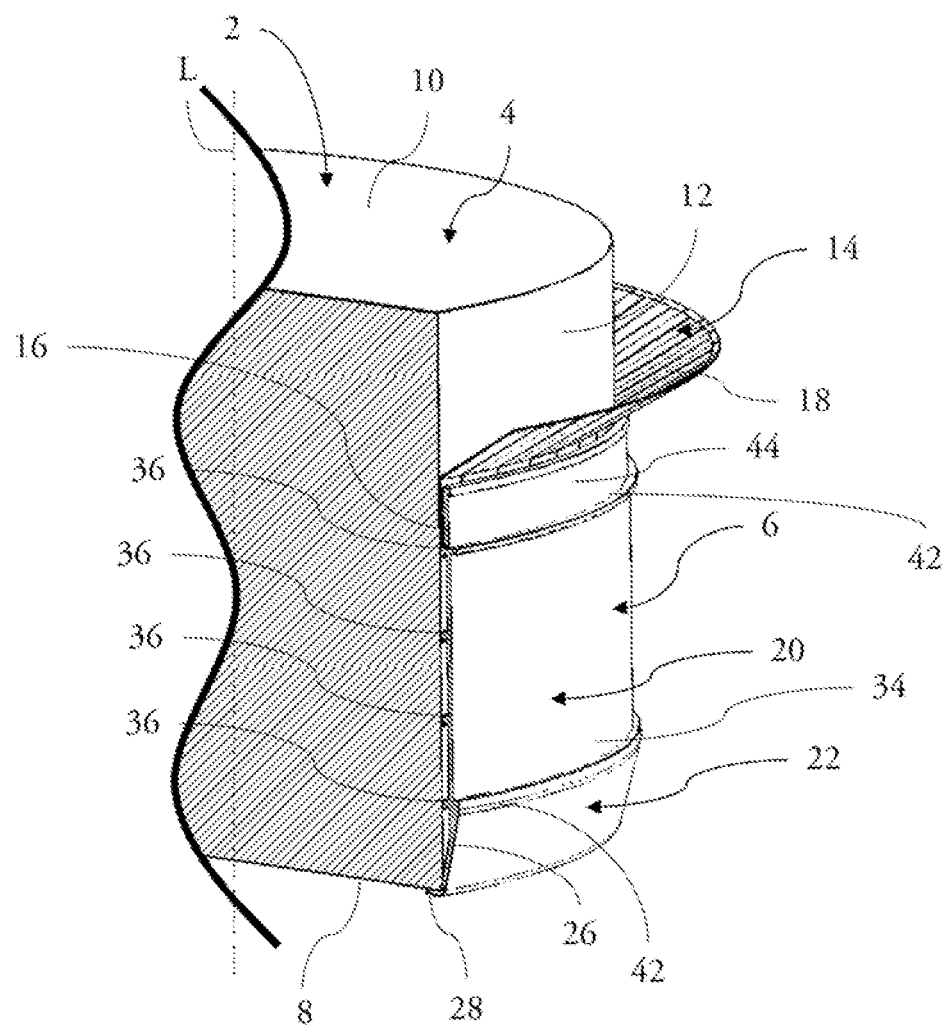

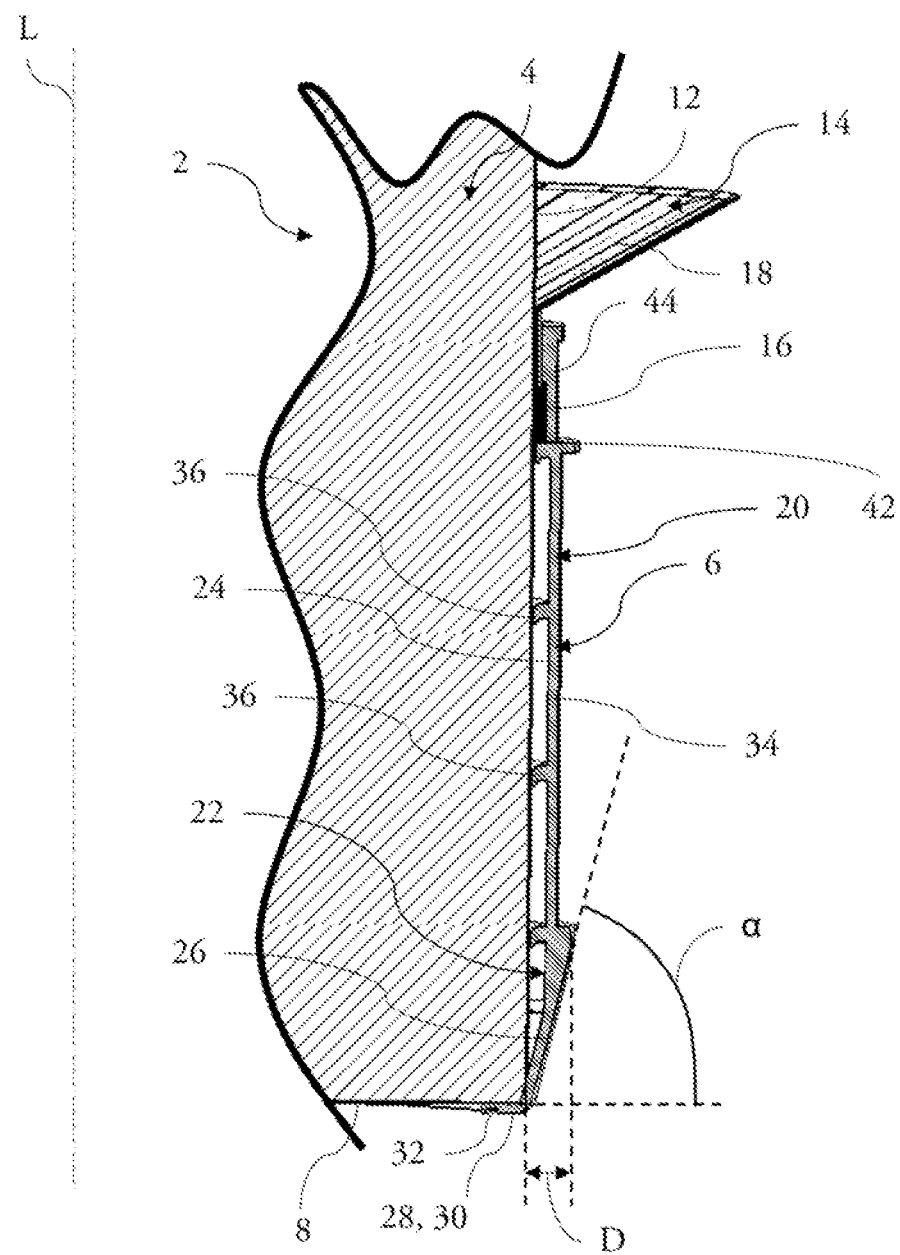
[Fig. 4]

PACKING SECTION FOR A GAS/LIQUID SEPARATION COLUMN

CROSS REFERENCE TO RELATED APPLICATIONS

This application claims the benefit of priority under 35 U.S.C. § 119 (a) and (b) to French patent application No. FR2201949, filed Mar. 7, 2022, and French patent application No. FR2211002, filed Oct. 24, 2022, which are incorporated herein by reference in their entireties.

FIELD OF THE INVENTION

The present invention relates to the field of gas/liquid separation columns, and to their assembly, and it concerns more particularly a process for installing a packing section in a casing in order to form these gas/liquid separation columns.

BACKGROUND OF THE INVENTION

Gas/liquid separation columns have been known for many years and make it possible, for example, for various chemical elements involved in the composition of a homogeneous fluid to be separated, for example by distillation or by absorption.

Manufacturing a gas/liquid separation column comprises, in particular, a step of inserting a plurality of packing sections into a casing. The packing sections are in particular used in the columns to ensure the exchange of material and heat between a rising gas and a descending liquid. These packing sections, which in particular consist of a superposition of treatment plates formed respectively by a plurality of corrugated strips, are often known as "packs". The packing sections are conventionally stacked on one another along the longitudinal direction of elongation of the column, if applicable with interposed separators, in order to participate in the separation of the components of the fluid over the axial dimension of the column. It is necessary for the packing sections to be correctly centered in the casing, with a constant clearance in accordance with what was provided during the design of the column, in order for the effectiveness of the gas/liquid separation to be optimal.

It is known for packing sections to be inserted into a vertically held casing, the force of gravity making the progression of the packing section inserted into the casing much easier. However, such a method can prove restrictive when the gas/liquid separation columns to be assembled have a large diameter and an axial dimension that requires the use of long casings of the order of several tens of metres in length. Specifically, such methods with vertical insertion of the packing sections then require equipment that is able to raise the packing sections over a large distance in order to place them facing the end of the casing, and also a production site having a ceiling height greater than the length of the casing.

It is therefore desired, for casings of great length, to make provision to assemble packing sections in a casing that is arranged horizontally. Such a position makes it difficult to insert the packing sections because said insertion requires a considerable pushing force along the whole length of the casing, with gravity no longer helping to move the packing section into the casing.

This force of gravity can even give rise to slight deformation of the casing, and make it complicated to center the packing section relative to an entry opening of the casing, facing which the packing section must be positioned before being pushed into this casing.

SUMMARY OF THE INVENTION

Certain embodiments fall within this context and aim to propose a solution that makes it possible to make the insertion of a packing section into the casing of a gas/liquid separation column easier, whether the casing and the direction in which the packing section is pushed into the casing are vertical or horizontal, and that furthermore makes it possible to ensure a good position of the packing section within the casing so as to guarantee the effectiveness of the gas/liquid separation within the casing.

By making the fluid return piece separate from the holding element, it becomes possible to choose materials with different stiffnesses for these two elements. Thus the return piece can be particularly flexible, allowing easier insertion into the casing, whereas the holding element has the stiffness necessary for its structural role.

The main subject of the present invention is a packing section intended to be installed in a casing so as to form a gas/liquid separation column, the packing section comprising a block for treating a fluid that has a generally cylindrical shape extending along a longitudinal direction, the treatment block being formed by a stack of plates for treating the fluid along the longitudinal direction, the treatment block having a first disc-shaped face and a second disc-shaped face that each extend in planes parallel to one another, the treatment block having an external face extending over the perimeter of said treatment block between the first disc-shaped face and the second disc-shaped face, the packing section having at least one element for holding the treatment block that extends at least partially around the external face of the treatment block, the holding element having a portion for holding the treatment plates of the treatment block in position and a portion disposed at a longitudinal end of the holding element and in contact with the first disc-shaped face, characterized in that a fluid return piece extends over the periphery of the packing section, the fluid return piece having a linking portion, which is substantially cylindrical and configured to be linked to the treatment block and to the holding element, and a portion for guiding the fluid that extends the linking portion by forming an inclined plane of which the distance from the external face of the treatment block increases with increasing distance from the linking portion, the fluid return piece being separate from the holding element, the linking portion being interposed between the holding element and the treatment block.

According to other, optional aspects:

the fluid return piece is less rigid than the holding element.

the linking portion of the fluid return piece has a thickness that is at most half, or even at most one third of the thickness of the holding portion of the holding element.

the fluid return piece is disposed such that the linking portion is disposed between the block and the overlap wall.

the guiding portion is able to move between a rest position and a working position, the guiding portion being free during the rest position while the guiding portion is at least partially pressed against an internal face of the casing in the working position.

the holding element is formed from aluminium and the fluid return piece is formed from aluminium.

the stop wall has at least one annular notch disposed on an external surface of the stop wall.

the holding portion has an annular wall surrounding the treatment block and at least one annular claw protruding from the annular wall towards the treatment block so as to be engaged in said treatment block.

the holding element comprises a plurality of annular claws protruding from the annular wall, being distributed along the longitudinal direction.

the overlap wall forms a housing for a protuberance of the linking portion of the fluid return piece.

Another subject of the present invention is a gas/liquid treatment column having a casing and at least one packing section as mentioned above.

BRIEF DESCRIPTION OF THE DRAWINGS

Further features, details and advantages of the invention will become more clearly apparent from reading the following description, and from a number of exemplary embodiments given by way of non-limiting indication, with reference to the appended schematic drawings, in which:

FIG. 1 is a schematic depiction of a casing in which there is housed at least one packing section according to one aspect of the invention, a packing section in this case being made visible by a fictitious partial cutaway of the casing, FIG. 1 furthermore making visible a device for installing a packing section within the casing by pushing;

FIG. 2 is a perspective depiction of the packing section illustrated in FIG. 1;

FIG. 3 is a partial depiction of a cross section of the packing section illustrated in FIG. 2, viewed in perspective;

FIG. 4 is a partial depiction of a cross section of the packing section illustrated in FIG. 2, viewed from the front.

DETAILED DESCRIPTION OF THE INVENTION

The features, variants and various embodiments of the invention may be combined with one another, in various combinations, as long as they are not mutually incompatible or mutually exclusive. It will be possible, in particular, to imagine variants of the invention that comprise only a selection of features described below, in a manner isolated from the other features described, if this selection of features is sufficient to provide a technical advantage and/or to differentiate the invention from the prior art.

In the figures, elements that are common to several figures retain the same references.

FIG. 1 illustrates a casing 1, in which there is installed at least one packing section 2 according to one aspect of the invention, and a device 100 for installing packing sections within the casing that is configured to, in a first step, dispose a packing section facing an opening of the casing and, in a second step, push the packing section into the casing. A column for gas/liquid separation of a fluid is formed once the casing 1 has been equipped with a plurality of packing sections 2, which are stacked on one another along a main longitudinal direction of elongation of the casing, with if applicable interposed separators that are not visible here.

The casing 1 extends mainly along a longitudinal direction L, thus having two longitudinal ends. In the example illustrated, the casing 1 is positioned horizontally during the insertion of the one or more packing sections, i.e. the longitudinal direction L extends substantially parallel to the ground on which the casing 1 is installed, it being understood that it is subsequently installed vertically so as to be used as a column for gas/liquid separation of the fluid. "Vertically" is understood to mean that the longitudinal direction L extends substantially perpendicular to the ground on which the casing 1 is installed.

The installation device 100 makes it possible in this case to insert the packing section 2 into a casing 1 positioned horizontally, and it should be noted that the packing section as will be described according to the invention advantageously makes it easier to insert it into the casing 1 in this horizontal assembly configuration. However, the advantageous features of the packing section that will now be described are just as advantageous in the case of insertion into a casing positioned vertically.

As illustrated in FIGS. 2 to 4, the packing section 2 comprises a block 4 for treating a fluid that has a generally cylindrical shape and an element 6 for holding the treatment block that is disposed around said treatment block 4.

The treatment block 4 extends along the longitudinal direction L, i.e. the axis of revolution of the treatment block 4 is parallel to the longitudinal direction L. The treatment block 4 has a first disc-shaped face 8 and a second disc-shaped face 10 that each extend in planes parallel to one another, and an external face 12 that forms the perimeter of said treatment block 4 between the first disc-shaped face 8 and a second disc-shaped face 10. Arbitrarily, the first disc-shaped face of the packing section is defined as being the one that is inserted into the casing first during the insertion of the corresponding packing section.

The treatment block 4 has plates for treating the fluid that are perforated and stacked along the longitudinal direction L. The treatment plates are thus superposed on one another in order to form the treatment block 4, by centering the treatment plates on the axis of revolution of the treatment block 4. Since the edges of the plates are aligned with one another along the longitudinal direction L, each of the plate edges participates in forming the external face 12 of the treatment block 4. The treatment plates can in particular consist of gratings formed by a weave of strips, which are if applicable corrugated, between which the fluid to be treated circulates.

As mentioned above, the element 6 for holding the treatment block 4 extends around the treatment block 4, in particular so as to be able to hold the treatment plates in position with respect to one another, both once the treatment block 4 is installed in the casing and during the insertion of this treatment block. To this end, the holding element 6 extends at least partially around the external face 12 of the treatment block 4, being in contact locally with the external face 12 of the treatment block 4.

The packing section 2 furthermore comprises a fluid return piece 14 separate from the holding element 6 and also extending over the periphery of the packing section 2. In this way, it is possible to choose a more rigid metallic material to manufacture the holding element and a less rigid metallic material to manufacture the return piece 14.

A zone in which the fluid return piece is covered by the holding element is formed on a portion of the treatment block, such that the fluid return piece is interposed in part between the holding element 6 and the treatment block 4. More particularly, and as will be described in greater detail below, the holding element has an overlap wall 44, visible in FIG. 4, configured to form a housing for receiving a protuberance formed on a linking portion 16 of the fluid return piece.

The fluid return piece 14 therefore has a linking portion 16, intended to be linked to the treatment block 4 and to the holding element 6, and a portion 18 for guiding the fluid that extends the linking portion 16 in the direction of the second disc-shaped face 10 of the treatment block 4, with reference to the orientation defined above according to which the first disc-shaped face 8 is the face that enters the casing first during the insertion of the packing section.

The linking portion 16 is a portion of the fluid return piece that is substantially cylindrical, the shape and the radial dimension of which are configured so that the linking portion is substantially pressed against the external face 12 of the treatment block 4. The guiding portion 18 is by contrast a frustoconical portion, which opens from the end of the linking portion 16 that it extends.

"The guiding portion 18 opens" is understood to mean that the radial dimension, or diameter, of the guiding portion 18 tends to increase with increasing distance from the linking portion and therefore increasing proximity to the second disc-shaped face 10.

The fluid return piece, unlike the holding element 6, is made from an elastic material, allowing flexibility of the guiding portion and possible deformation, in particular during the insertion of the packing section into the casing. More particularly, the guiding portion 18 can adopt a rest position and a working position, the guiding portion 18 being free during the rest position while the guiding portion 18 is at least partially pressed against an internal face of the casing 1 in the working position. It will be understood that during the mounting of the packing section 2 in the casing 1, the guiding portion 18 passes from the rest position, before insertion thereof into the casing, to the working position during the insertion into the casing such that at least the free end of the guiding portion 18 is in contact with the internal face of the casing 1.

As mentioned, the fluid return piece 14 is produced separately from the holding element 6 and has a part disposed between the treatment block 4 and the holding element 6. The positioning of the holding element 6 against the treatment block 4 thus participates in fixing the position of the fluid return piece with respect to this treatment block, in particular by covering all or part of the linking portion. In order to ensure the position of the fluid return piece, fastening means can be provided, for example rivets, between the linking portion 16 of the fluid return piece 14 and the holding element 6.

The linking portion and preferably the entire return piece has a thickness of between 0.2 and 0.6 mm whereas the holding element has a thickness of between 2 and 4 mm. By this means or by other means, for example the material used, the fluid return piece 14 is less rigid than the holding element 6.

According to the invention, and as is particularly visible in FIGS. 2 to 4, the holding element 6 has a portion 20 for holding the treatment plates of the treatment block 4 in position, which is of cylindrical shape with circular section so as to be disposed facing the external face 12 of the treatment block, and an annular portion 28 that does not have slots.

The annular portion forms a stop wall 28 extending in annular fashion protruding from the holding portion 20 towards the inside of the disc-shaped face 8.

As is visible in FIGS. 3 and 4, the stop wall 28 is pressed against the first disc-shaped face 8 when the holding element 6 is mounted on the treatment block 4. The radial dimension of the stop wall 28 is determined so that it is possible to form a longitudinal stop that is large enough to hold the holding element 6 in position with respect to the treatment block 4 without however impeding the circulation of fluid from one packing section to the other at the periphery of the treatment block 4.

The stop wall 28 extends at 90° to the holding portion 20.

The stop wall 28 in this case has an internal surface in contact with the first disc-shaped face 8 of the treatment block 4, and an external surface 30 intended to be in contact with a separator or a neighbouring packing section.

As is visible in FIG. 4, the stop wall 28 can have at least one annular notch 32 disposed on the external surface 30 of the stop wall 28. This annular notch 32 can extend over the entire perimeter of the stop wall. It will be understood that the annular notch 32 is more particularly produced as close as possible to the free end of the stop wall 28. The annular notch 32 forms a detachment surface that makes it possible to prevent fluid, by capillary action, coming to stagnate on the external surface 30 of the stop wall.

The holding portion 20 has an annular wall 34 surrounding the treatment block 4 and at least one annular claw 36 protruding from the annular wall 34 towards the inside of the holding portion, and therefore towards the treatment block 4. More particularly, the holding element 6 comprises a plurality of annular claws 36 protruding from the annular wall 34 and distributed along the longitudinal direction L. The annular wall 34 extends at a distance from the treatment block and forms a main body of the holding element 6 connecting the various components of this holding element 6 including the overlap wall 44 mentioned above, and the annular claws 36 form members that cooperate with the treatment block 4 so as to secure the latter to the holding element 6. The annular claws 36 can in particular each have the shape of a hook that is able to grip one or more treatment plates of the treatment block 4, being implanted in the material of the treatment plates, between the interlaced corrugated strips in particular so as to thus maintain the distance between the holding element and the treatment block 4.

The annular claws 36 can be substantially similar to one another, extending in a circular manner over the entire perimeter of the annular wall 34, and they can be distributed regularly along the annular wall 34 in the longitudinal direction L.

One of the claws is disposed at the junction of the annular wall 34 and the overlap wall 44, which longitudinally extends the annular wall 34. At this junction, a protrusion is formed on the outside of the annular wall 34 in a plane perpendicular to the longitudinal direction L so as to form a stiffening rib 42 that in this case has the shape of a ring, as is in particular visible in FIGS. 2 and 3.

As has been mentioned, the overlap wall 44 has on its internal face, facing the treatment block, when the holding element 6 is mounted on the treatment block 4, a housing for a protuberance of the linking portion 16 of the fluid return piece 14. It will be understood here that the linking portion 16 extends at least in part into the housing, and this contributes to fixing the position of the fluid return piece 14 with respect to the holding element 6 and the treatment block 4.

The holding element 6 can be formed from aluminium and the fluid return piece 14 can be formed from aluminium.

As it has just been described, the present invention does indeed achieve its stated objective, namely proposing a packing section 2 having a holding element 6 configured to make the insertion of the packing section 2 into the casing 1 easier and to optimize the centered position of the packing section within the casing.

The present invention is not limited to the means and configurations described and illustrated in the present document, however, and also extends to any equivalent means and configuration and to any technically operational combination of such means.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

We claim:

1. A packing section configured to be installed in a casing so as to form a gas/liquid separation column, the packing section comprising:
    a treatment block configured to treat a fluid that has a generally cylindrical shape extending along a longitudinal direction;
        the treatment block being formed by a stack of treatment plates configured to treat the fluid along the longitudinal direction;
        the treatment block having a first disc-shaped face and a second disc-shaped face that each extend in planes parallel to one another;
        the treatment block having an external face extending over the perimeter of said treatment block between the first disc-shaped face and the second disc-shaped face;
    at least one holding element configured to hold the treatment block that extends at least partially around the external face of the treatment block;
        the at least one holding element having a holding portion for holding the treatment plates of the treatment block in position and a stop wall disposed at a longitudinal end of the at least one holding element and in contact with the first disc-shaped face, wherein the holding portion comprises an annular wall and an overlap wall; and
    a fluid return piece extends over the periphery of the packing section, the fluid return piece having a linking portion, which is substantially cylindrical and configured to be linked to the treatment block and to the at least one holding element, and a guiding portion configured to guide the fluid that extends the linking portion by forming an inclined plane of which the distance from the external face of the treatment block increases with increasing distance from the linking portion, the fluid return piece being separate from the at least one holding element, the linking portion being interposed between the at least one holding element and the treatment block.

2. The packing section according to claim 1, wherein the fluid return piece is less rigid than the at least one holding element.

3. The packing section according to claim 1, wherein the linking portion of the fluid return piece has a thickness that is at most half of the thickness of the holding portion of the at least one holding element.

4. The packing section according to claim 1, wherein the fluid return piece is disposed such that the linking portion is disposed between the treatment block and the overlap wall.

5. The packing section according to claim 4, wherein the guiding portion is configured to move between a rest position and a working position, the guiding portion being free during the rest position while the guiding portion is at least partially pressed against an internal face of the casing in the working position.

6. The packing section according to claim 5, wherein the least one holding element is formed from aluminium and the fluid return piece is formed from aluminium.

7. The packing section according to claim 1, wherein the stop wall has at least one annular notch disposed on an external surface of the stop wall.

8. The packing section according to claim 1, wherein the holding portion has the annular wall surrounding the treatment block and at least one annular claw protruding from the annular wall towards the treatment block so as to be engaged in said treatment block.

9. The packing section according to claim 8, wherein the at least one holding element comprises a plurality of annular claws protruding from the annular wall, being distributed along the longitudinal direction.

10. The packing section according to claim 1, wherein the overlap wall forms a housing for a protuberance of the linking portion of the fluid return piece.

11. A gas/liquid treatment column having a casing and at least one packing section according to claim 1.

* * * * *